Figure 1:
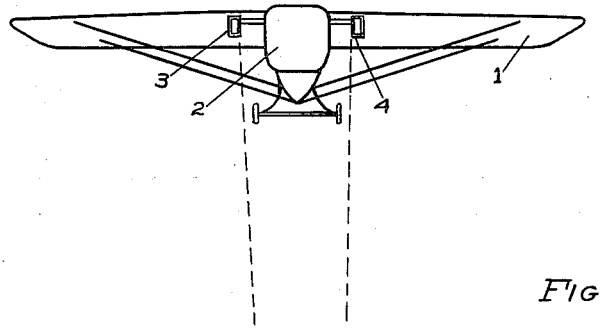

Nov. 27, 1934.    E. E. TURNER, JR    1,982,271
MEANS AND METHOD OF MEASURING DISTANCE
Filed May 19, 1930    3 Sheets-Sheet 1

INVENTOR
EDWIN E TURNER JR.
By Ezekiel Wolf
ATTORNEY

Nov. 27, 1934.                 E. E. TURNER, JR                  1,982,271
                    MEANS AND METHOD OF MEASURING DISTANCE
                    Filed May 19, 1930            3 Sheets-Sheet 3

INVENTOR
EDWIN E TURNER JR.

BY
Ezekiel Wolf
ATTORNEY

Patented Nov. 27, 1934

1,982,271

UNITED STATES PATENT OFFICE 1,982,271

METHOD AND MEANS OF MEASURING DISTANCE

Edwin E. Turner, Jr., West Roxbury, Mass., assignor to Submarine Signal Company, Boston, Mass., a corporation of Maine Application May 19, 1930, Serial No. 453,733

12 Claims. (Cl. 250—1)

The present invention relates to a method and apparatus for measuring distances from a radiating source to an object capable of reflecting the radiation coming to the object. In particular, the invention relates to a means and method for determining distances, heights and depths in air or water, respectively, or in any other medium capable of propagating the radiated energy. In the present case the invention relates more particularly to the determination of the height of an aircraft from the ground or the distance of an aircraft from some energy-reflecting surface, the energy means employed being preferably electromagnetic waves, although other suitable energy radiating means may be used.

The problem of determining the height of aircraft above the ground is particularly difficult in weather in which the visibility is poor under which conditions visual methods fail entirely. When the visibility is very poor, as, for instance, when there is a fog, flying has proved to be extremely dangerous, the pilot does not know the height of the plane from the ground and therefore can not make a proper landing on the landing field.

This danger in flying already has been recognized and various means have been devised to give the pilot an indication of the height of his plane when flying and when landing. Most common of the devices used are the barometric altimeter which is fairly accurate if the barometric corrections are known but is otherwise subject to considerable error when local barometric conditions are not known. Unfortunately this is very often the case since barometric conditions vary for different places and at different times. Unfortunately, also, the aviator may not know the number of feet above sea level of the place where he is forced to land.

Other apparatus has also been used. One type of apparatus employs the measurement of the capacity between a pair of plates on the plane and the ground, the capacity measurement giving the distance from the ground. Since, however, the capacity is an inverse function of the distance, the higher up the plane goes, the less accurate the measurement becomes and while, therefore, for short distances the capacity method is useful, it probably can not be used as advantageously for great distances. Further the capacity method requires that the plane be on an even keel for accurate measurement, which is not the case with the present system.

Another method which has been employed is that of creating standing radio waves and noting as the plane is rising or descending the number of loops or nodes the plane goes through in coming up or going down on some sort of a tally indicator or "memory meter". The difficulty with this method is that the number of nodes or loops must be carefully counted in order that the pilot may know his height accurately. If the signal at one node or loop should fail to produce an indication or record on the tally instrument, or if a stray signal should cause the operation of the device, the height may be considerably in error. It may be noted that in this type of altimeter the errors are accumulative and may cause serious inaccuracies.

An altimeter to be of practical utility for an aviator should be reliable and accurate and should also work automatically and give a continuous indication of the height of the aircraft above the ground or from the nearest obstacle.

The present invention discloses a device which preferably employs electromagnetically radiated waves which form of energy is to be preferred to sound waves at the present time because of the difficult conditions for acoustic reception on an aircraft as the result of engine and other noises.

The present invention may use a modulated high frequency wave as disclosed in the companion application of Robert W. Hart, Serial No. 453,726, filed May 19, 1930, or may employ a radiated wave comparable in wave length to twice the greatest height which it is desired to measure or may employ a wave length approximately four times the height to be measured depending upon factors which will be explained. The radiated wave is maintained at a definite frequency by means of piezo-electric control or other suitable well-known methods and is preferably transmitted and received by means of directive antennæ whereby the greater part of the direct radiated energy will not be picked up by the receiving antenna. In addition to this the receiving system outside of the receiving loop may be totally shielded and the direct wave, if any, picked up by the receiver, may be eliminated by feeding in a reverse manner energy from the transmitting circuit to the receiving circuit. A further feature of the invention is the use of a cathode ray or Braun tube having control plates and one or more control grids the respective functions of which are to control the deflection of the electron stream and to stop the electron beam or allow it to pass from the hot cathode through the anode to the indicating screen. The apparatus is such that no mechanical moving parts are necessary and further it may be made extremely light and give continuous and automatic indications of the height. The indicator may be placed on the instrument board and can be made of a size comparable with the size of other instruments and the height may be read from a scale in a similar fashion.

Further features of the invention and the application of the same will be more clearly understood in connection with the following description and drawings illustrating an embodiment thereof.

Figure 2:
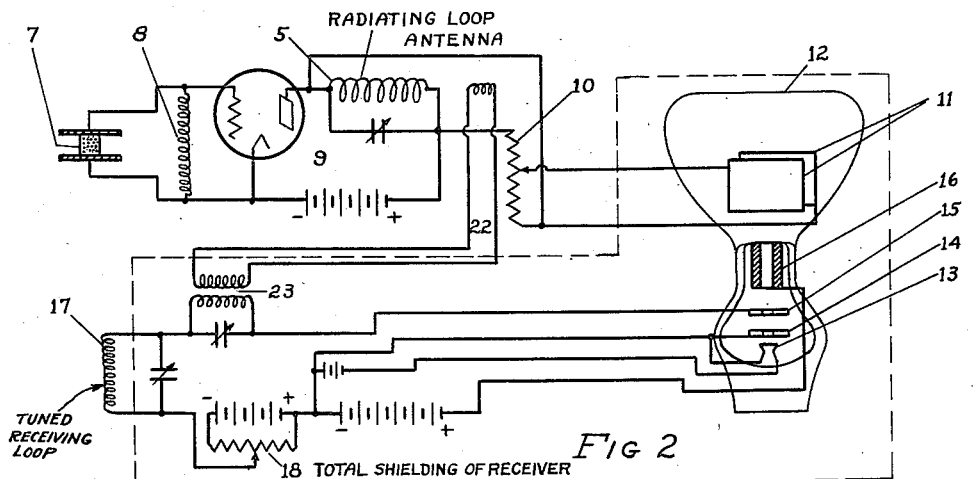
Figure 3:
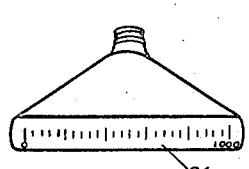
Figure 1A:
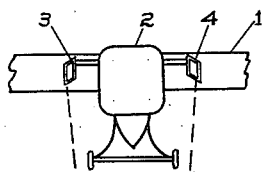
Figures 4, 5:
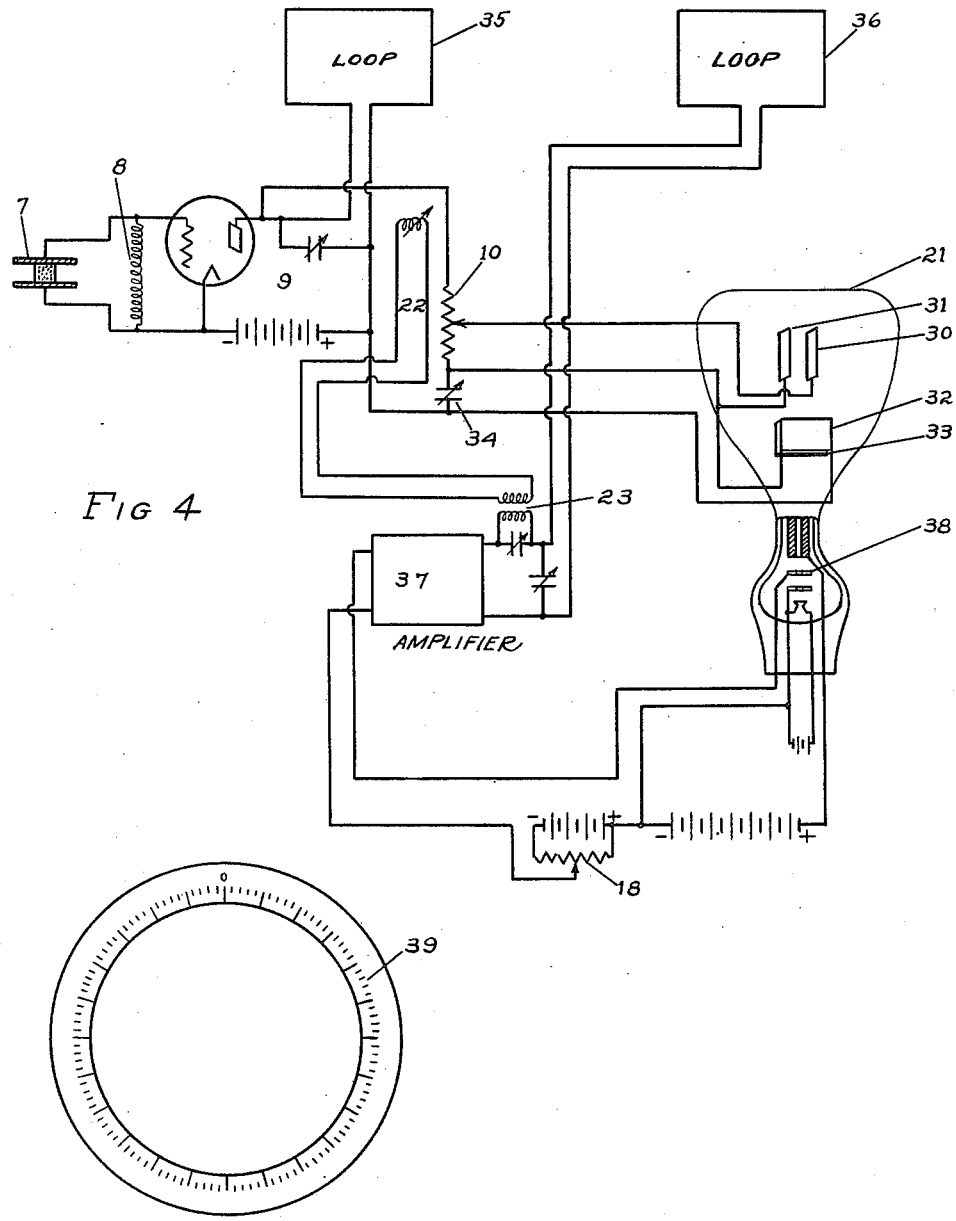
Figure 7:
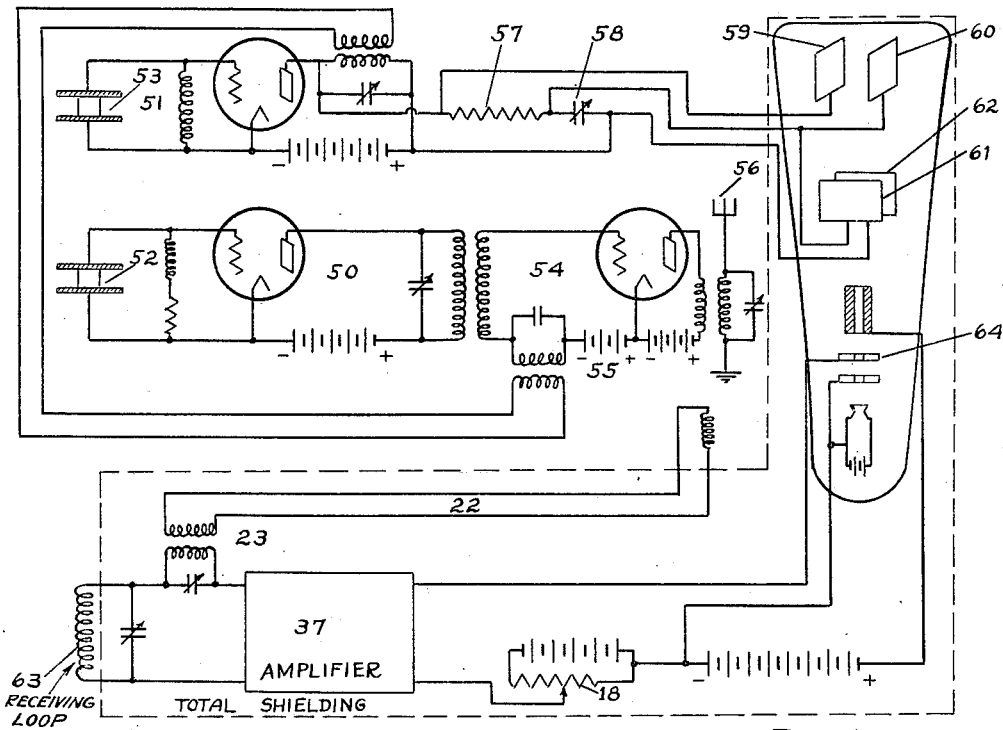
Figure 6:
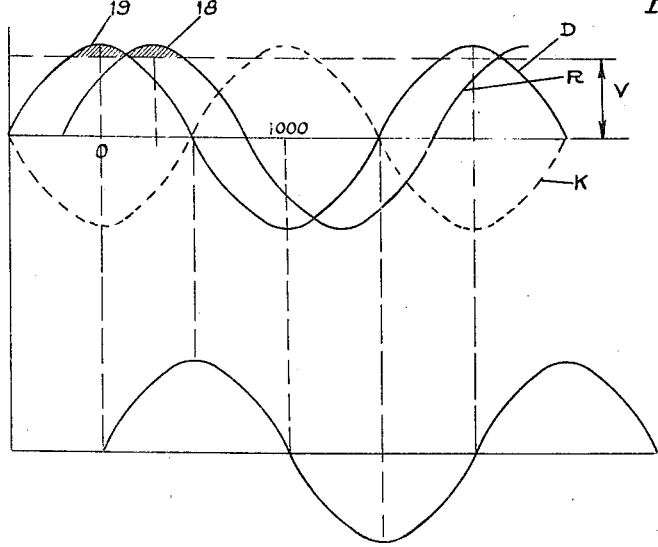

In the drawings Figs. 1 and 1a indicate the general position of the radiating and receiving antennæ. Fig. 2 shows a diagrammatic representation of the invention. Fig. 3 illustrates a detail of the indicating tube. Fig. 4 shows a modified form of the apparatus shown in Fig. 2. Fig. 5 shows a detail of the indicator shown in Fig. 4. Fig. 6 illustrates graphically the principle of the invention, and Fig. 7 shows a further modification of the device indicated in Fig. 2.

In Fig. 1 two loops may be used which may be placed on each side of the fusilage 2 of the plane 1. These loops 3 and 4 may be used for transmitting and receiving, respectively, the electromagnetic waves. They may be placed in planes parallel to each other and perpendicular to the ground or reflecting object, or, as shown in Fig. 1a, the two loops may be placed in planes respectively perpendicular to each other and perpendicular to the reflecting object. As shown in Fig. 1 the loops 3 and 4 are least sensitive and transmit least in the direction perpendicular to the plane of the loop but unless there is some magnetic shielding with the loops placed in this position, there may be some inductive transfer of energy from the transmitter to the receiver. In Fig. 1a while the loop 3 will radiate in the direction of the loop 4, the loop 4 will not receive from the direction of the loop 3 and also will not pick up any energy from 3 due to the coupling between the two loops, since this coupling is substantially zero on account of the mutually perpendicular relation of the two loops.

In both Fig. 1 and Fig. 1a loops 3 and 4 are in planes perpendicular to the plane of the reflecting object, so that these loops are in the most advantageous position for the transmission of radiated energy to, and reception of energy from the reflecting object.

If it is desired to have the apparatus effective for heights of 1000 meters, it is preferable to have the wave length of the radiated wave over 4000 meters or perhaps over double the wave length, that is 2000 meters depending on the system employed, though harmonics of these wave lengths may be used providing it is remembered that there is the possibility of doubled indication, and the particular reflected wave corresponding to the direct wave is recognized and used. However, in place of using such long wave lengths when loop antennæ are used short waves may be used and modulated at the longer wave period in which case directive radiation is simpler and the reflecting qualities of the radiated wave are better. In the device indicated in Fig. 2, 5 indicates the radiating loop which emits electromagnetic radiated waves at the desired frequency of say 4000 meters in wave length. This frequency is definitely controlled through a piezo-electric oscillator 7 connected across the inductance 8. The circuit 9 may be any of the well-known types of tuned oscillators and is preferably adjustable to a single frequency although frequencies which are harmonics of a fundamental may be used.

Across the radiating loop is a resistance 10 which is connected to the control plates 11, 11 of the indicator 12. The indicator 12 is of the type of tube known as a Braun or cathode ray tube and comprises, besides the control plates 11, 11, a heated filament 13, a screen 14, a control grid 15 and an anode 16. The tube has preferably a very high vacuum though conduction tubes may at times be used. The anode is constructed with an opening through it through which the electron beam passes.

This beam is created by the potential difference between the anode and the cathode which draws the electrons from the cathode, producing electron velocities approaching the velocity of light.

The reflected wave as indicated by the dotted lines in Fig. 1 is picked up by the tuned receiving loop 17 and made to operate through an amplifier or directly the control grid 15 of the indicator. In the preferred manner of operating the system the control grid 15 is maintained highly negative by means of the potentiometer 18 which may be adjusted to the point where the beam in the indicator is just repelled except when the peak of the reflected wave is received. If the control voltage $V_1$, as shown in Fig. 6, is set so that just the peak of the reflected wave R surpasses it, then for the time shown by the shaded part 18 of the reflected wave above the grid bias line $V_1$, the beam in the electron indicator or cathode ray tube will pass through the anode and be reflected on the luminescent end 21 of the tube producing a visible spot. In the system shown in Fig. 1, the radiated wave controls by means of the connection of the resistance 10 across the control plates 11 the position which the beam will assume when an indication is produced. As the voltage varies from a maximum positive to a maximum negative, the beam, if present during the whole time, would move across the scale shown in Fig. 3 from zero to 1000. As, however, the beam only is visible at one particular point it produces a spot on the scale assuming the position as controlled by the voltage on the plates at the time the indication is produced.

If the direct wave is not eliminated, the indicator will mark at zero as indicated by 19 where the direct wave surpasses the bias voltage. The direct wave may, however, be eliminated by feeding from the transmitting circuit to the receiving circuit a wave opposite in phase to the direct wave D as shown by the dotted wave K in Fig. 6. By eliminating the direct wave there will be produced only a single indication on the indicator. The feeding of the direct wave into the receiving circuit is accomplished through the circuit 22 coupled to the oscillating circuit 9 and to the receiving circuit through the coupling coils 23. The total scale of the device of Fig. 3 corresponds to one half the wave length of the emitted wave as seen by the points marked 0 and 1000. If the scale is 1000 meters the half wave corresponds to 2000 meters and the control wave therefore to 4000 meters.

Fig. 6 illustrates how the time interval is measured. The direct wave D employed on the control plates 11 by means of the adjustable voltage obtained by the adjustable connection across the resistance 10 causes the beam to assume positions successively from one end of the scale to the other in accordance with the varying potential across the control plates. At the point 0, as shown in Fig. 6, the potential across the plates is a maximum positive potential. In the middle of the scale the potential is zero and at the end of the scale it is a maximum negative. As the curve D is a sinusoidal function the beam assumes a direct position with respect to the time elapsed from the zero position. The scale may, therefore, be directly calibrated in distances corresponding to the wave length of the wave D.

The reflected wave R being received with the phase displacement, as shown in Fig. 6, will produce an indication which will be visible on the scale in the position corresponding to the voltage control by the direct wave D. As shown in Fig. 6 the distance from 0 to 1000 corresponds to a distance of 1000 meters and to a wave length therefore of 4000 meters.

In the modification shown in Fig. 4 the indicator 21 has two sets of control plates 30, 31, 32 and 33 which are displaced relatively 90° in phase. The beam emitted from the cathode through the anode under these conditions will with a sinusoidal voltage produce a circular rotation in which the beam will make one complete revolution in one wave length of the direct wave. As the distance traveled by the wave is double the distance itself a 2000 meter wave will give a full scale reading of 1000 meters in this system. The system shown in Fig. 4 is controlled similarly as that indicated in Fig. 2 by means of a crystal oscillator controlling the oscillating circuit 9. A resistance 10 and capacity 34 are connected across the oscillating circuit and furnish the varying potential for the rotation of the electron beam. In the device shown in Fig. 4 the wave radiated from the loop 35 is received after reflection on the loop 36 and passed through the amplifier 37 to the cathode ray indicator which is provided with a control grid 38 biased by the potentiometer control 18 in such a manner that the beam will be suppressed except when the peak of the received wave is sufficient to overcome this bias. The bias is set at such a value that a sharp indication is produced corresponding to the peak of the reflected wave.

As shown in Fig. 2 the direct wave may be eliminated in the receiving circuit by feeding in a reverse manner the wave from the transmitting circuit to the receiving circuit as indicated by the circuit 22 which may be fed as shown in Fig. 4 in a position before the signal is amplified.

In the operation of the system shown in Fig. 4, the beam produced at the instant of the peak of the reflective wave will give a spot on or adjacent to the scale 39 shown in Fig. 5, the position of the spot corresponding to the voltage phase on the plates 30, 31, 32 and 33 as controlled by the emitted wave.

In Fig. 7 a modification of the system indicated in Fig. 2 is shown in which a high frequency short wave is used and in which radiation of this high frequency wave is suppressed but at the times of the peak of the modulating wave controlling the control plates. In Fig. 7, 50 indicates a high frequency oscillatory circuit of the order of 1 to 5 meters. 51 indicates a lower frequency oscillatory circuit of the order of one to 2000 meters. Both of these oscillators may be crystal controlled as indicated by 52 and 53, although the high frequency circuit does not necessarily have to be so controlled since its frequency does not enter into the measurement of the time interval. The circuit 54 is the radiating circuit which is biased by a battery 55 preventing any radiation from the oscillator 50 to the antenna circuit 56, except when the bias 55 is overcome. This is overcome by means of the lower frequency oscillatory circuit 51 at the peaks of which the voltage is sufficient to overcome the bias on the grid of the circuit 54 and allow the oscillator 50 to transfer power to the radiating source 56.

In this manner periodic impulses may be emitted by the antenna 56 corresponding to the peaks of the low oscillatory frequency of the oscillator 51. The oscillator 51 controls by means of the resistance 57 and the capacity 58 the phase on the control plates 59, 60, 61 and 62 which ordinarily would produce a rotation of the beam as described in connection with Fig. 4. The energy radiated at the peaks of the oscillations in the circuit 51 is picked up after being reflected by the receiving loop 63 and in a manner similar to that described in Fig. 4 cause to operate the control grid 64 and produce an indication on the scale.

Having now described my invention, I claim:

1. A system for determining distances or depths with the help of reflected wave motion comprising means for emitting a periodic continuous wave vibration, means for receiving said wave vibration after reflection from the object whose distance is to be measured and means for indicating the time interval between the emission and reception including means for producing an electron beam, means for synchronously controlling the deviation of the electron beam from the instant of the emitted wave vibration and means for indicating the receipt of the reflected vibrations.

2. A system for determining distances or depths with the help of reflected wave motion comprising means for emitting a periodic continuous wave vibration, means for receiving said wave vibration after reflection from the object whose distance is to be measured and means for indicating the time interval between the emission and reception including a cathode ray tube capable of producing an electron beam and control plates, means including said control plates for controlling the position of the beam synchronously with the emission of the wave, a control grid and means operatively connecting said control grid with said receiving means for allowing the beam to pass through the anode when the reflected wave is received.

3. In a system for depth or distance measurement, a cathode ray tube having a cathode, an anode, control plates, a control grid and an indicating screen on which the electron beam impinges and is visible, in combination with an electrical time functioning circuit for impressing a potential on the control plates, a receiving means and means operatively connecting said means to said control grid normally suppressing the electron beam except when said receiving means is operated whereby visible indication is produced on the screen at the instant the signal reaches a predetermined strength.

4. In a system for depth or distance measurement, a cathode ray tube having a cathode, an anode, control plates, an oscillating circuit providing a power source, a control grid in combination with an electrical time functioning circuit comprising a condenser and a resistance connected in series with each other and in parallel across said power source and the control plates and means included in part in said circuit for removing the potential source at a point marking zero time.

5. A system for depth and distance measurement comprising means for emitting wave energy including an oscillating power source, means for receiving wave energy reflected from the surface whose distance is to be measured, and means for measuring the time interval between the emitted wave energy and the receipt of the reflected energy comprising a cathode ray tube having a cathode, an anode, control plates, a control grid in combination with an electrical time functioning circuit comprising a condenser and a resistance connected in series with each other and in parallel across said power source and the control plates and means for removing the potential source at a point marking zero time and means for impressing the energy of the receiving means on the control grid to allow the electron beam to pass through the anode at the receipt of the reflected wave.

6. A system for depth and distance measurement comprising means for radiating a periodic continuous wave vibration having a wave length comparable with the greatest distance to be measured, means for receiving the reflected wave after reflection from the object whose distance is to be measured and also the direct wave from the transmitting source, means for impressing upon the receiving means in reverse phase an amount of the direct vibration to neutralize the direct wave, and means for producing an indication by that portion of the received wave above a certain definite chosen amplitude, and a time measuring means for measuring the time interval between the instant of the emitted wave and the production of the indication.

7. A system for depth and distance measurement comprising means for radiating a periodic continuous wave vibration having a period comparable with the greatest distance to be measured, means for receiving the reflected wave after reflection from the object whose distance is to be measured and also the direct wave from the transmitting source, means for impressing upon the receiving means in reverse phase an amount of the direct vibration to neutralize the direct wave, and a cathode ray tube having a control grid for controlling the electron beam, means for impressing the received wave upon said control grid, said control grid having a definite potential for suppressing said beam except at the peak of said received wave, and a plurality of control plates in said tube for controlling the position of said beam and means for impressing a potential on said plates synchronously with the emitted wave and a scale whereby the position of the beam on the scale indicates the distance.

8. A system for depth or distance measurement comprising means radiating a periodic continuous wave vibration having a wave length comparable with the greatest distance to be measured, means for receiving the reflected wave after reflection from the object whose distance is to be measured, means for neutralizing the direct wave in the receiving system, means for indicating the peak of the reflected wave and means for positioning said indication with respect to a scale, said means being controlled synchronously at the frequency of the radiated wave.

9. A system for depth or distance measurement comprising means for radiating a periodic continuous wave vibration having a period comparable with the greatest distance to be measured, means for receiving the reflected wave after reflection from the object whose distance is to be measured, means for neutralizing the direct wave in the receiving system, means for indicating and measuring the time interval between the direct and reflected wave comprising means for deflecting synchronously with the emitted wave an electron beam and means for suppressing the beam except at the peak of the reflected wave.

10. A system for indicating the heights of aircrafts above the ground comprising means for radiating electromagnetic waves in the direction of the earth and means for receiving the wave reflected from the earth's surface, means for neutralizing the direct wave in the receiving means and means for indicating the time interval between two corresponding points on the emitted and received waves including a cathode ray tube adapted to produce an electron beam means adapted to make said beam oscillate across a scale in synchronism with the emitted wave and a control grid for suppressing said beam and means connecting said grid with said receiving means for removing the suppression of said beam for the point of the received wave corresponding to the point of the emitted wave marking the zero of the scale.

11. In a system for measuring heights from an aircraft to a reflecting surface, in combination with said aircraft, means for transmitting electromagnetic waves including a transmitting loop antenna positioned on one side of the fuselage, a receiving loop positioned on the other side and means including a cathode ray tube for measuring the time between the emission of the transmitted signal and the reception of the signal reflected.

12. In a system for measuring heights from an aircraft in combination with said aircraft, means for transmitting electromagnetic waves including a transmitting loop antenna positioned on one side of the fuselage of said aircraft and means for receiving said waves including a separate receiving loop positioned on the other side of said fuselage, said loops being normally substantially vertical and perpendicular to each other.

EDWIN E. TURNER, JR.